Nov. 6, 1923.  1,473,387
P. R. SIMMONS
APPARATUS FOR AND METHOD OF MANUFACTURING PAPER DISHES
Filed April 27, 1922   2 Sheets-Sheet 1
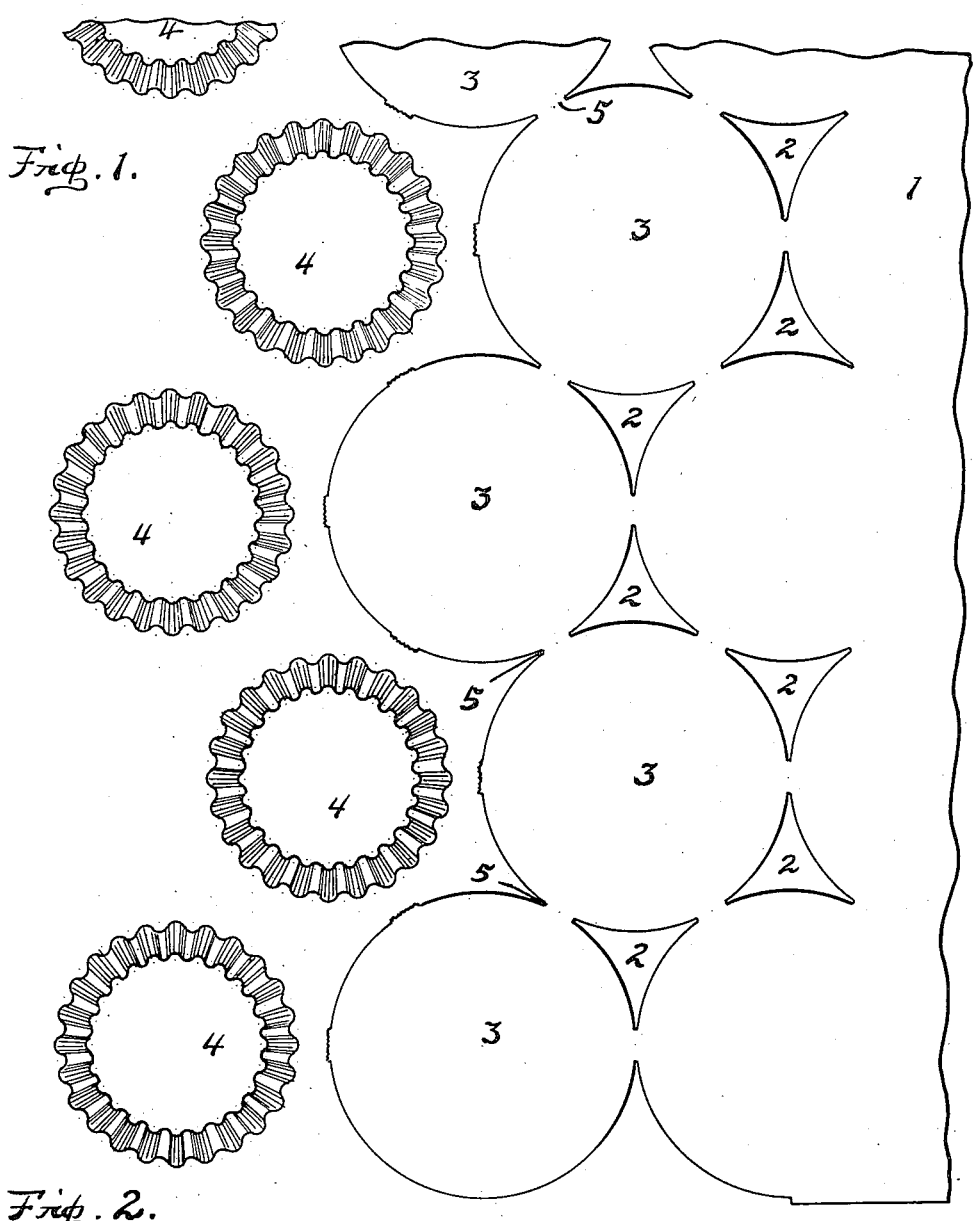
Fig. 1.
Fig. 2.
Paul R. Simmons, Inventor
By H. G. Burns, Attorney

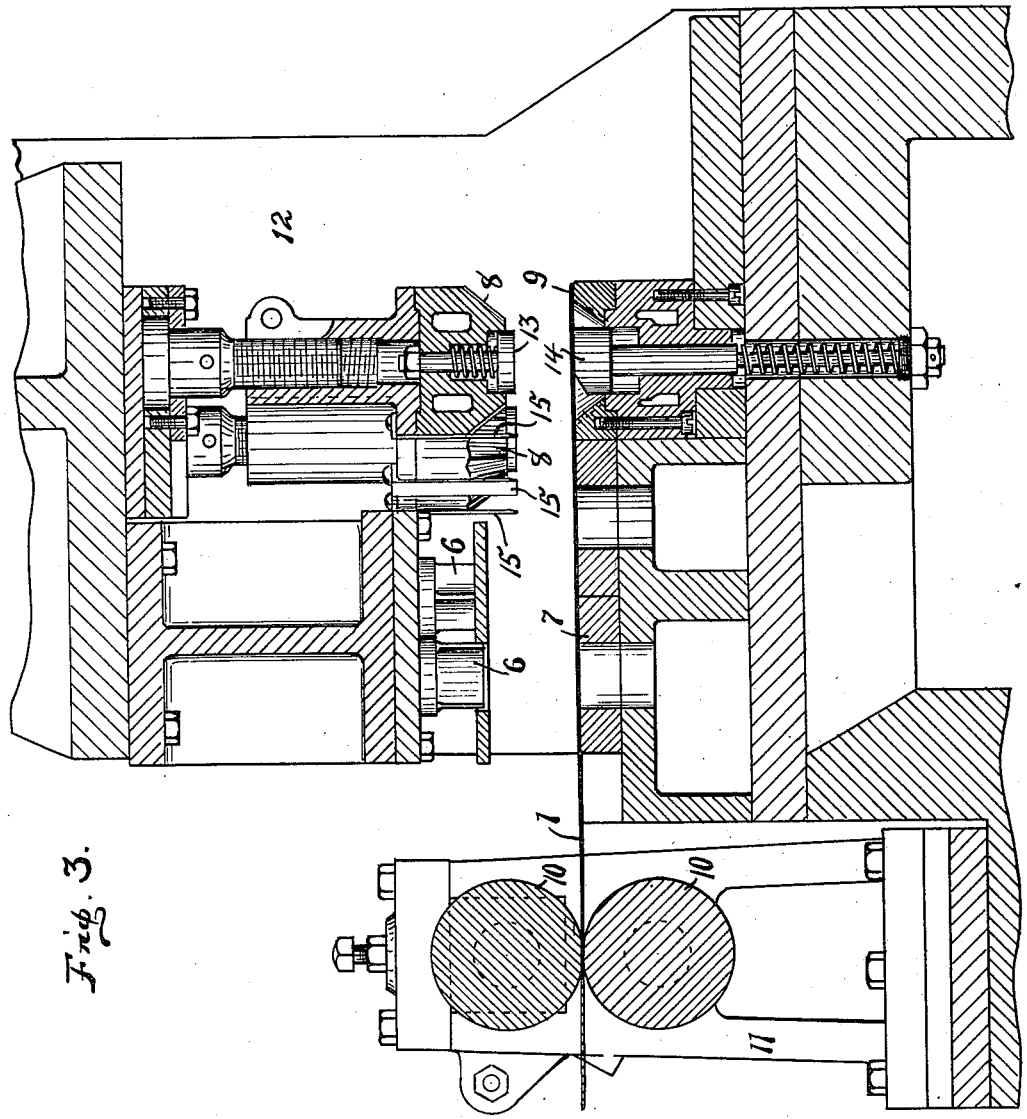

Patented Nov. 6, 1923.

1,473,387

UNITED STATES PATENT OFFICE.

PAUL R. SIMMONS, OF HUNTINGTON, INDIANA, ASSIGNOR TO PEERLESS PAPER PRODUCTS COMPANY, OF INDIANAPOLIS, INDIANA, A CORPORATION.

APPARATUS FOR AND METHOD OF MANUFACTURING PAPER DISHES.

Application filed April 27, 1922. Serial No. 556,949.

*To all whom it may concern:*

Be it known that I, PAUL R. SIMMONS, a citizen of the United States of America, and resident of Huntington, in the county of Huntington and State of Indiana, have invented certain new and useful Improvements in Apparatus for and Methods of Manufacturing Paper Dishes, of which the following is a specification.

This invention relates to improvements in apparatus for and method of manufacturing paper dishes, and the object thereof is to afford means and a method of rapid manufacture of dishes from a continuous sheet paper stock with negligible waste of the material; and particularly, to provide for the gang manufacture of dishes of circular form from a continuous sheet of paper stock in a manner whereby the waste material is eliminated from the sheet, and the blanks of which the dishes are subsequently formed, are retained in linked groups preparatory to the final forming operation.

In the ordinary method of preparing circular and similar blanks from sheet material for the manufacture of dishes, the waste material tends to encumber the final forming operation which impedes manufacture and causes frequent imperfections in the finished product so that a loss of material is entailed. The present object therefore, is to circumvent interference of the voids removed from the sheet of material during the blanking operation preparatory to forming the blanks into the finished stage of manufacture, and thereby obviate waste of the stock.

The foregoing objects are accomplished by preparing a sheet stock of linked blanks and subjecting the same to a forming operation in a suitable machine as illustrated in the accompanying drawings, in which:—

Fig. 1 is a diagram of a sheet formed with a group of linked blanks and a detached series of formed dishes arranged in the order of their manufacture;

Fig. 2 is an elevation of a completed dish formed of one of the blanks of the group; and Fig. 3 is a vertical section of the blanking and forming apparatus for the manufacture of the invention.

The characters appearing in the description refer to parts shown in the drawings and designated thereon by corresponding characters.

The invention consists primarily in preparing a continuous paper sheet 1 by making therein a series of voids 2 leaving intact a group of linked blanks 3, and subsequently severing and forming said blanks into dishes 4 in successive groups. The intention is to retain the blanks 3 in their relative order as they are formed from the sheet by means of the links 5 which are intact so that the blanks may be progressed unitedly from the blanking dies 6—7 to the forming dies 8—9 by advancing the sheet 1 in successive stages. The sheet is advanced for the successive operations by means of a feeding device consisting of a pair of rollers 10 mounted in a frame 11. The particular construction of the feeding device is immaterial to the present invention as any other suitable mechanism adapted to progress the sheet intermittently between the blanking and forming operations in the press 12 may be employed.

The blanking dies 6—7 are of ordinary construction and operate in a manner common in the art. These dies are shaped and arranged in the press 12 so that the voids 2 are formed in successive series in the sheet 1 as the press is operated.

The forming dies 8—9 are of a type suited to shape the blanks 3 finally into the form of dishes, and may be of any suitable design and construction capable of imparting the desired form to the blanks. These dies are also arranged in the press 12 so as to operate upon the blanks 3 as they are progressed from the blanking operation of the dies 6—7 by the action of the feeding device on the sheet 1. In each die 8—9 is arranged a corresponding spring sustained jaws 13 and 14 respectively adapted to clamp and hold the blanks in alinement with the dies during the operation thereof, and the jaw 14 is also adapted to expel the formed dish from the die 9 when the operation is completed.

In connection with the dies 8 are a series of knives 15 adapted to come into contact with and sever the links 5 as the corresponding blanks 3 are gripped between the jaws 13 and 14 of the dies 8—9. In this manner the blanks are retained in linked formation until they have been moved into alinement with the corresponding forming dies and definitely held in proper position for the final forming operation.

By eliminating the material between the blanks, as in forming the voids 5 and by retaining the blanks in linked formation, the necessity of the usual gages or jigs in the press for the guidance of the blanks are obviated. Also, in forming the voids preliminary to the movement of the blanks to the forming dies the waste material is entirely eliminated from the sheet before the blanks are severed and formed.

What I claim is:—

1. The method for the gang manufacture of dishes of circular form from a sheet of paper stock including making a series of voids so as to leave a group of circular blanks tangentially connected, whereby said blanks will be united for handling and held in proper position by their tangential connections for subsequent treatment, severing said tangential connections after the blanks are positioned for subsequent treatment, and forming said blanks into dishes in such positions.

2. The method for the gang manufacture of dishes of circular form from a sheet of paper stock including making a series of voids so as to leave a group of circular blanks tangentially connected, whereby said blanks will be united for handling and held in proper position by their tangential connections for subsequent treatment, and simultaneously severing the tangential connections between said blanks and forming the blanks into dishes.

3. The method for the gang manufacture of dishes of circular form from a sheet of paper stock including making a series of voids so as to leave a group of circular blanks in staggered positions relative to each other and tangentially connected, whereby said blanks will be united for handling and held in proper position by their tangential connections for subsequent treatment, severing said tangential connections after the blanks are positioned for subsequent treatment, and forming said blanks into dishes in such positions.

4. An apparatus for the gang manufacture of paper dishes from a sheet of paper stock including a series of blanking dies shaped and arranged to cut a series of disconnected voids in the sheet so as to leave and form a series of circular blanks tangentially connected, whereby said blanks will be united for handling and held in proper position by their tangential connections for subsequent treatment, a second series of dies adapted to form said blanks into dishes, a series of knives for separating said blanks at their tangential connections, and means for feeding said series of blanks from the blank forming position to the dish forming positions and registering with said dies and knives, substantially as set forth.

5. An apparatus for the gang manufacture of paper dishes from a sheet of paper stock including a series of blanking dies shaped and arranged to cut disconnected voids in the sheet so as to leave and form a series of circular blanks in staggered relations to each other and tangentially connected, whereby said blanks will be united for handling and held in proper position by their tangential connections for subsequent treatment, a second series of dies adapted to form said blanks into dishes, a series of knives for separating said blanks at their tangential connections, and means for feeding said series of blanks from the blank forming positions to the dish forming positions and registering with said dies and knives, substantially as set forth.

6. An apparatus for the gang manufacture of paper dishes from a sheet of paper stock including a series of blanking dies shaped and arranged to cut a series of disconnected voids in the sheet so as to leave and form a series of circular blanks tangentially connected, whereby said blanks will be united for handling and held in proper position by their tangential connections for subsequent treatment, means for feeding the series of blanks to the dish forming positions, a series of dish forming dies registering with said blanks when in dish forming positions, and a series of knives registering with the tangential connections between said blanks for severing the same.

7. An apparatus for the gang manufacture of paper dishes from a sheet of paper stock including a series of blanking dies shaped and arranged to cut a series of disconnected voids in the sheet so as to leave and form a series of circular blanks tangentially connected, whereby said blanks will be united for handling and held in proper position by their tangential connections for subsequent treatment, means for feeding the series of blanks to the dish forming position, a series of dish forming dies registering with said blanks when in dish forming positions, a series of knives registering with the tangential connections between said blanks for severing the same, and means for operating simultaneously said knives and dish forming dies.

8. An apparatus for the gang manufacture of paper dishes from a sheet of paper stock including a series of blanking dies shaped and arranged to cut a series of disconnected voids in the sheet so as to leave and form a series of circular blanks tangentially connected, whereby said blanks will be united for handling and held in proper position by their tangential connections for subsequent treatment, a second series of dies adapted to form said blanks into dishes, a series of knives for separating said blanks at their tangential connections, means for feeding said series of blanks from the blank forming position to the dish forming positions and registering with said dies and knives, substantially as set forth, and means for simultaneously operating the blanking dies and dish forming dies, so that as a group of blanks are being made, another group of blanks are being formed into dishes.

In testimony whereof I affix my signature in presence of two witnesses.

PAUL R. SIMMONS.

Witnesses:
JOHANNA SULLIVAN,
PAUL S. RAGAN.